(No Model.) 2 Sheets—Sheet 1.
W. A. VAN BRUNT.
GRAIN DRILL.
No. 412,808. Patented Oct. 15, 1889.
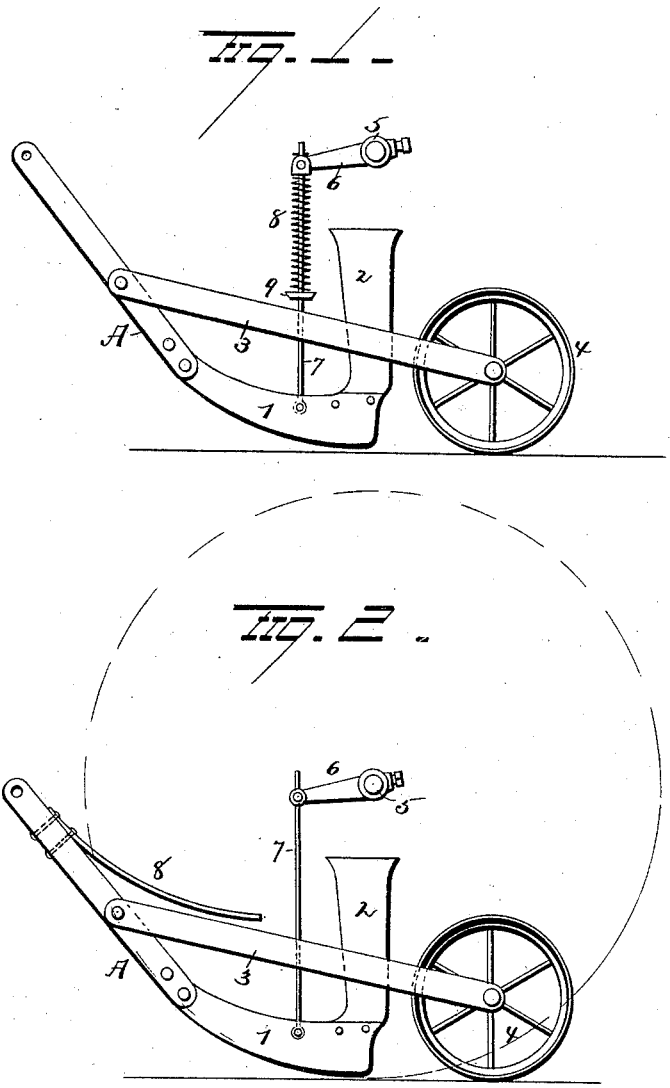
Witnesses
R. Nottingham
Geo. F. Downing
Inventor
Willard A. Van Brunt
By his Attorney
H. A. Seymour (No Model.) 2 Sheets—Sheet 2.
W. A. VAN BRUNT.
GRAIN DRILL.
No. 412,808. Patented Oct. 15, 1889.
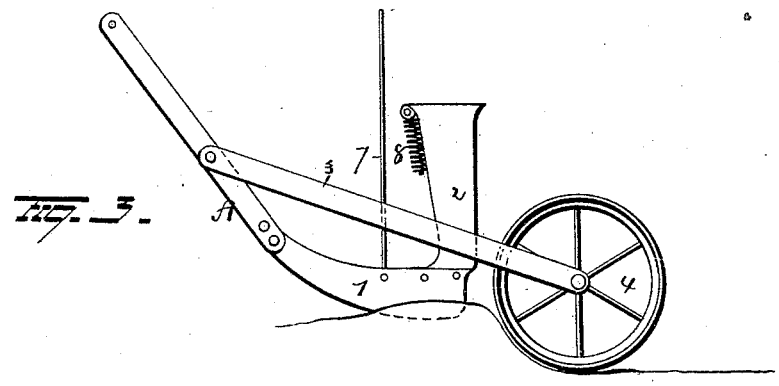
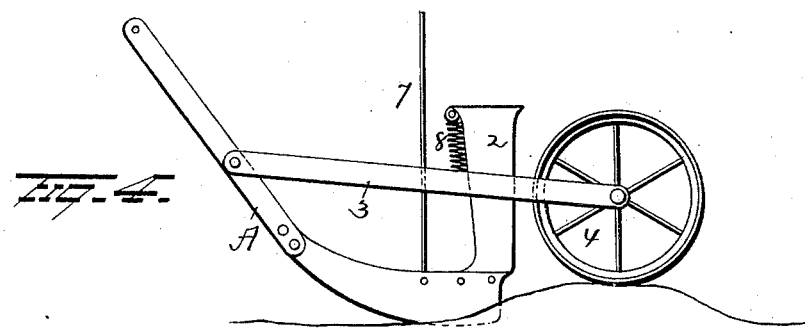
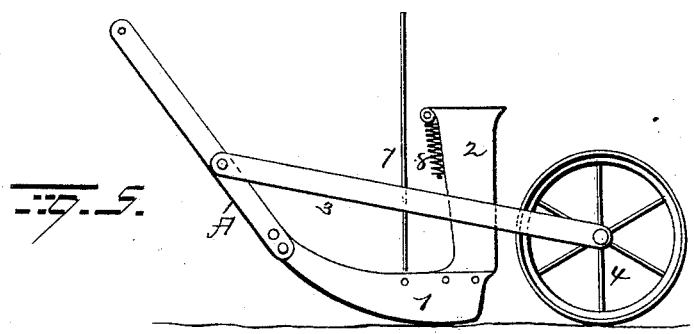

UNITED STATES PATENT OFFICE.

WILLARD A. VAN BRUNT, OF HORICON, WISCONSIN.

GRAIN-DRILL.

SPECIFICATION forming part of Letters Patent No. 412,808, dated October 15, 1889.

Application filed August 3, 1889. Serial No. 319,622. (No model.)

*To all whom it may concern:*

Be it known that I, WILLARD A. VAN BRUNT, of Horicon, in the county of Dodge and State of Wisconsin, have invented certain new and useful Improvements in Devices for Covering Grain; and I do hereby declare the following to be a full, clear, and exact description of the invention, such as will enable others skilled in the art to which it appertains to make and use the same.

My invention relates to an improvement in covering devices for grain-drills, the object being to plant the seed a given depth in soil varying in degrees of hardness and unevenness of surface.

To this end my invention consists in a hoe or share, a feeding-spout, and covering-wheel, in connection with spring mechanism for automatically regulating the pressure upon the hoe or transferring it to the covering-wheel, according to the soil in which the seed is being sown or deposited.

It further consists in certain novel features of construction and combinations of parts, as will be hereinafter described, and pointed out in the claims.

In the accompanying drawings, Figure 1 is a side elevation of my improved attachment. Fig. 2 is a modification; and Figs. 3, 4, and 5 are also modifications showing several different positions taken by the hoe in the movement of the machine.

A represents the usual drag-bar, which is pivotally or otherwise attached to the frame of the machine. The hoe or shoe 1 is rigidly secured to or formed integral with the lower end of the drag-bar, and the vertical feeding-spout 2, which deposits the seed in the trench as it is formed by the hoe, is held on the rear end of the latter. One or two (preferably two) bales or straps 3 are pivotally secured to the drag-bars at their forward ends, and they carry a covering-wheel 4 at their rear ends, which follow immediately in the track of the trench formed by the share or hoe, covering the latter and packing the earth over the seed. The usual rocking shaft 5 extends across the machine, and arms 6 6 project forward from this shaft over each share or hoe. Rods 7 7 are pivoted at their lower ends to the shares, and at their upper ends they extend loosely through rings, buttons, or similar devices loosely connected with their outer ends. A spiral spring 8, mounted on each of these rods between the rings and washers 9, exerts a constant pressure, which, when the arms are in the position shown in Fig. 1, makes the shares cut a uniform depth; but beyond a certain depth they cannot go, for washers 9 finally abut against the straps or bales 3, thus transferring the weight to the straps and the covering-wheel. The tension of the springs operates to force the share or hoe into hard lumpy soil, and, as the shares go in of their own accord in soft soil, the pressure is transferred to the covering-wheels, so that the soft soil is packed. The consequence is that the seed is planted at a uniform depth and the soil is packed when soft.

In the modification shown in Fig. 2 an elliptic spring 8 is secured to the drag-bar so that its free end projects over the straps 3. In this instance, after the share has reached a certain depth, the pressure is transferred to the wheel.

In the modification shown in Figs. 3, 4, and 5, a spiral spring 8 is attached to the tube in position to bear on the drag-bar. The different figures illustrate different positions assumed as the machine passes over a rough surface.

In addition to the arrangements described the bales or straps might be pivoted to the spouts, and the spring might be changed to conform and produce like results.

It is evident that slight changes might be resorted to in the form and arrangement of the several parts described without departing from the spirit and scope of my invention, and hence I do not wish to limit myself to the particular construction herein set forth; but, Having fully described my invention, what I claim as new, and desire to secure by Letters Patent, is—

1. The combination, with feed-spouts and shares or hoes, of covering-wheels connected therewith and springs for retaining the shares in the ground at a uniform depth and transferring the pressure to the wheels the moment the shares tend to sink into the ground beyond this uniform depth, substantially as set forth.

2. The combination, with drag-bars, hoes or shares connected thereto, and feed-spouts located on the shares or hoes, of straps or bales pivotally secured to the drag-bars, covering-wheels journaled in the straps or bales, and springs adapted to transfer pressure upon the covering-wheels when the shares or hoes sink beyond a certain depth, substantially as set forth.

3. The combination, with drag-bars, shares or hoes secured thereto, and feed-spouts located on the shares, of straps or bales, covering-wheels journaled therein, a rod extending upward from the share, and a spring mounted thereon and adapted to exert a constant pressure upon the share and transfer its pressure to the wheels when the share has reached a certain depth, substantially as set forth.

4. The combination, with drag-bars, shares, feed-spouts, and straps or bales pivotally secured to the drag-bars and having covering-wheels journaled in their rear ends, of a rocking shaft, arms thereon, rods pivotally secured to the shares and having loose connection with the arms, said rods having washers thereon, and springs mounted on the rods between the arms and washers, adapted to exert a constant pressure on the shares and transfer this pressure to the wheels when the share has reached a certain depth, substantially as set forth.

In testimony whereof I have signed this specification in the presence of two subscribing witnesses.

WILLARD A. VAN BRUNT.

Witnesses:
C. L. BUTTERFIELD,
J. H. PETHERBRIDGE.